United States Patent
Goldenson et al.

(10) Patent No.: US 10,054,608 B2
(45) Date of Patent: Aug. 21, 2018

(54) PHOTODIODE-AUGMENTED INFRARED SENSOR

(71) Applicant: Google Inc., Mountain View, CA (US)

(72) Inventors: Andrew Goldenson, Palo Alto, CA (US); Anurag Gupta, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/158,918

(22) Filed: May 19, 2016

(65) Prior Publication Data

US 2017/0336432 A1    Nov. 23, 2017

(51) Int. Cl.
*G01P 13/00*    (2006.01)
*G01V 8/10*    (2006.01)

(52) U.S. Cl.
CPC .............. *G01P 13/00* (2013.01); *G01V 8/10* (2013.01)

(58) Field of Classification Search
CPC .................................. G01V 8/10; G01P 13/00
See application file for complete search history.

(56) References Cited

U.S. PATENT DOCUMENTS

| | | | | |
|---|---|---|---|---|
| 5,045,702 A * | 9/1991 | Mulleer | ................... | G01J 5/34 |
| | | | | 250/338.3 |
| 5,973,594 A * | 10/1999 | Baldwin | ................. | G01K 1/16 |
| | | | | 340/506 |
| 7,161,152 B2 * | 1/2007 | DiPoala | ............... | G08B 13/191 |
| | | | | 250/338.3 |
| 2010/0141444 A1 * | 6/2010 | Brown | ................. | G01J 5/0022 |
| | | | | 340/555 |
| 2014/0354430 A1 * | 12/2014 | Soldner | ............. | G08B 13/1895 |
| | | | | 340/555 |
| 2016/0073042 A1 * | 3/2016 | Cambou | .................... | G01J 5/34 |
| | | | | 348/165 |
| 2016/0302284 A1 * | 10/2016 | Herman | ............ | H05B 37/0218 |

* cited by examiner

*Primary Examiner* — Christine S Kim
(74) *Attorney, Agent, or Firm* — Morris & Kamlay LLP

(57) ABSTRACT

Methods and apparatus relating to a photodiode-augmented infrared (IR) motion sensor are provided. The IR motion sensor can be used to sense mid-IR range radiation emitting from a person. Within the IR motion sensor, incident mid-IR range radiation impinges on an IR sensing element situated behind a Fresnel lens. Thus, when the person crosses a particular region in the range of the IR motion sensor, the IR sensing element detects a change in radiation signature, and can subsequently notify another system, such as a security system, of the change. The IR motion sensor also includes an ambient light-sensing element configured to provide information used to perform a quality check, such as to rule out "false positive" outputs, on information output from the IR sensing element.

33 Claims, 9 Drawing Sheets

PHOTODIODE-AUGMENTED INFRARED SENSOR

BACKGROUND

Conventional pyroelectric infra-red (PIR) motion sensors, also known as passive infra-red motion sensors, can be used to sense mid-IR range radiation emitting from a person in the range of the PIR motion sensor. However, conventional PIR motion sensors also output false positive signals due to transient rays of light from the sun. For example, when transient rays of light from the sun go through a window, inside a building, and impinge on a conventional indoor PIR motion sensor, a false output signal can result. A false signal can also be generated when transient rays of light from the sun impact a conventional PIR motion sensor that is mounted outdoors. For these reasons, conventional PIR motion sensors are often used inside, or outside at night when sunlight is not present, such as to turn a light on when someone is nearby. A conventional approach is to complement the conventional PIR motion sensors with another sensing technology which is not affected by light, such as 10.525 GHz radar.

BRIEF SUMMARY

This summary provides a basic understanding of some aspects of the present teachings. This summary is not exhaustive in detail, and is neither intended to identify all critical features, nor intended to limit the scope of the claims.

Methods and apparatus relating to a photodiode-augmented infrared (IR) sensor are provided. In an example, a method for processing photodiode-augmented IR sensor information is provided. The method includes receiving first input data indicating an infra-red (IR) radiation intensity and receiving second input data indicating a visible light intensity. The method also includes identifying, from the first input data and the second input data, one or more of a presence of IR radiation or an absence of IR radiation. The method further includes identifying, from the first input data and the second input data, one or more of a presence of visible light or an absence of visible light. The method can also include identifying, from a simultaneous substantial presence of IR radiation and substantial presence of visible light, a false positive state indicating no motion. The method can also include identifying, from a simultaneous substantial absence of IR radiation and substantial presence of visible light, a negative state indicating no motion. The method can also include identifying, from a simultaneous substantial presence of IR radiation and substantial absence of visible light, a positive state indicating motion. The method can also include initiating, in response to identifying a positive state, turning on one or more of a camera, a light, an alarm, or a combination thereof. The method can also include identifying, from a simultaneous substantial absence of IR radiation and substantial absence of visible light, a negative state indicating no motion. The method can also include identifying, from a presence of visible light, a state of ambient lighting in an atmosphere adjacent to the mixed-element array. The method can also include adjusting, based on information in the second input data, processing of the first input data. The method can also include identifying, from the first input data and the second input data, one or more of: a transition from a substantial absence of the IR radiation to a substantial presence of the IR radiation, a transition from a substantial presence of the IR radiation to a substantial absence of the IR radiation, a transition from a substantial absence of the visible light to a substantial presence of the visible light, a transition from a substantial presence of the visible light to a substantial absence of the visible light, or a combination thereof.

In a further example, provided is a non-transitory computer-readable medium, comprising processor-executable instructions stored thereon. The processor-executable instructions are configured to cause a processor to execute one or more parts of the aforementioned method. The non-transitory computer-readable medium can be integrated with a device, such as a security system.

In another example, provided is a first apparatus configured to process photodiode-augmented IR sensor information. The first apparatus includes means for receiving first input data indicating an IR radiation intensity and means for receiving second input data indicating a visible light intensity. The first apparatus also includes means for identifying, from the first input data and the second input data, one or more of a presence of IR radiation or an absence of IR radiation. The first apparatus also includes means for identifying, from the first input data and the second input data, one or more of a presence of visible light or an absence of visible light. The first apparatus can also include means for identifying, from a simultaneous substantial presence of IR radiation and substantial presence of visible light, a false positive state indicating no motion. The first apparatus can also include means for identifying, from a simultaneous substantial absence of IR radiation and substantial presence of visible light, a negative state indicating no motion. The first apparatus can also include means for identifying, from a simultaneous substantial presence of IR radiation and substantial absence of visible light, a positive state indicating motion. The first apparatus can also include means for initiating, in response to identifying a positive state, turning on one or more of a camera, a light, an alarm, or a combination thereof. The first apparatus can also include means for identifying, from a simultaneous substantial absence of IR radiation and substantial absence of visible light, a negative state indicating no motion. The first apparatus can also include means for identifying, from a presence of visible light, a state of ambient lighting in an atmosphere adjacent to the mixed-element array. The first apparatus can also include means for adjusting, based on information in the second input data, processing of the first input data. The first apparatus can also include means for identifying, from the first input data and the second input data, one or more of: a transition from a substantial absence of the IR radiation to a substantial presence of the IR radiation, a transition from a substantial presence of the IR radiation to a substantial absence of the IR radiation, a transition from a substantial absence of the visible light to a substantial presence of the visible light, a transition from a substantial presence of the visible light to a substantial absence of the visible light, or a combination thereof. Further, the first apparatus can include a security system coupled to the means for identifying one or more of the presence of IR radiation or the absence of IR radiation.

In another example, provided is a second apparatus configured to process photodiode-augmented IR sensor information. The second apparatus includes a mixed-element array. The mixed-element array includes an IR element configured to generate a first output based on received IR radiation, as well as an ambient light-sensing element configured to generate a second output based on received visible light. The second apparatus includes a lens including a plurality of lenslets configured to direct the received IR light to the IR element, and to direct the received visible light to the ambient light-sensing element. The mixed-element array can include a plurality of IR elements including the IR element, as well as a plurality of ambient light-sensing elements including the ambient light-sensing element. The plurality of IR elements and the plurality of ambient light-sensing elements can be arranged in at least one of: a checkerboard pattern, alternating rows, alternating columns, an orthogonal matrix, a matrix with every other row being offset, a matrix with every other column being offset, or a combination thereof. The ambient light-sensing element can be a photodiode. The device of claim 1, wherein the lens can be a Fresnel lens. The plurality of lenslets can have a focal point substantially in a center of the mixed-element array. The second apparatus can include a processor configured to receive the first output and the second output, to identify, from the first output and the second output, one or more of a presence of IR radiation on the IR element or an absence of IR radiation on the IR element, as well as to identify, from the first output and the second output, one or more of a presence of visible light on the ambient light-sensing element or an absence of visible light on the ambient light-sensing element. The processor can be further configured to identify, from a simultaneous substantial presence of IR radiation on the IR element and substantial presence of visible light on the ambient light-sensing element, a false positive state indicating no motion. The processor can be further configured to identify, from a simultaneous substantial absence of IR radiation on the IR element and substantial presence of visible light on the ambient light-sensing element, a negative state indicating no motion. The processor can be further configured to identify, from a simultaneous substantial presence of IR radiation on the IR element and substantial absence of visible light on the ambient light-sensing element, a positive state indicating motion. The processor can be further configured to, in response to identifying the positive state, initiate turning on one or more of a camera, a light, an alarm, or a combination thereof. The processor can be further configured to identify, from a simultaneous substantial absence of IR radiation on the IR element and substantial absence of visible light on the ambient light-sensing element, a negative state indicating no motion. The processor can be further configured to identify, from a presence of visible light on the ambient light-sensing element, a state of ambient lighting in an atmosphere adjacent to the mixed-element array. The processor can be further configured to adjust, based on information in the second output, processing of the first output. The processor can be further configured to identify, from the first output and the second output, one or more of: a transition from a substantial absence of the IR radiation on the IR element to a substantial presence of the IR radiation on the IR element, a transition from a substantial presence of the IR radiation on the IR element to a substantial absence of the IR radiation on the IR element, a transition from a substantial absence of the visible light on the ambient light-sensing element to a substantial presence of the visible light on the ambient light-sensing element, a transition from a substantial presence of the visible light on the ambient light-sensing element to a substantial absence of the visible light on the ambient light-sensing element, or a combination thereof. The second apparatus can also include a second mixed-element array including a second IR element configured to generate a third output based on second received IR radiation, and a second ambient light-sensing element configured to generate a fourth output based on second received visible light; as well as a second lens including a second plurality of lenslets configured to direct the second received IR radiation and configured to direct the second received visible light. The first output can be coupled with an inverted version of the third output, the second output can be coupled with an inverted version of the fourth output, the third output can be coupled with an inverted version of the first output, the fourth output can be coupled with an inverted version of the second output, or a combination thereof. A security system can be coupled to the mixed-element array.

The foregoing broadly outlines some of the features and technical advantages of the present teachings so the detailed description and drawings can be better understood. Additional features and advantages are also described in the detailed description. The conception and disclosed examples can be used as a basis for modifying or designing other devices for carrying out the same purposes of the present teachings. Such equivalent constructions do not depart from the technology of the teachings as set forth in the claims. The inventive features characteristic of the teachings, together with further objects and advantages, are better understood from the detailed description and the accompanying drawings. Each of the drawings is provided for the purpose of illustration and description only, and does not limit the present teachings.

BRIEF DESCRIPTION OF THE DRAWINGS

The accompanying drawings, which are included to provide a further understanding of the disclosed subject matter, are incorporated in and constitute a part of this specification. The drawings also illustrate examples of the disclosed subject matter and together with the detailed description serve to explain the principles of examples of the disclosed subject matter. No attempt is made to show structural details in more detail than are necessary for a fundamental understanding of the disclosed subject matter and various ways in which the disclosed subject matter can be practiced.

Figure 1:
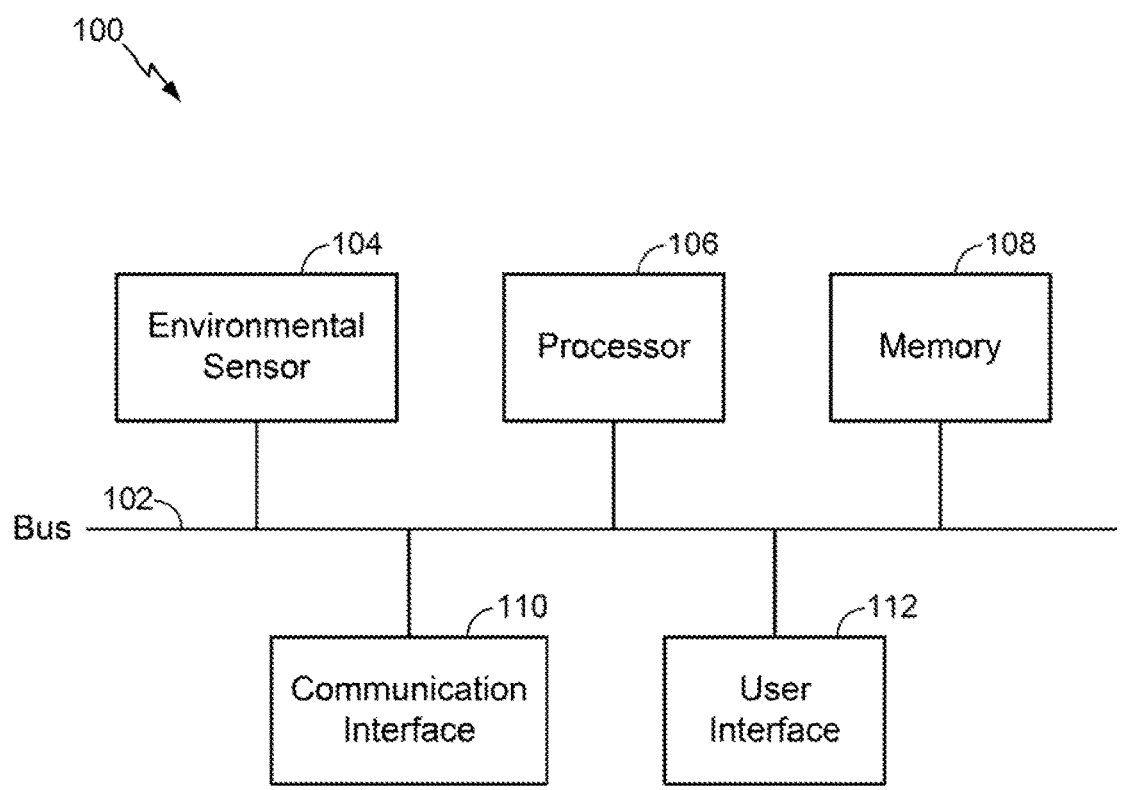
FIG. 1 shows an example sensor according to an example of the disclosed subject matter.

In accordance with common practice, features depicted by the drawings may not be drawn to scale. Accordingly, dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Methods and apparatus relating to a photodiode-augmented IR sensor are provided. The IR motion sensor can be used to sense mid-IR range radiation emitting from a person. Within the IR motion sensor, incident mid-IR range radiation impinges on an IR sensing element situated behind a Fresnel lens. Thus, when the person crosses a particular region in the range of the IR motion sensor, the IR sensing element detects a change in radiation signature and can subsequently notify another system, such as a security system, of the change. The IR motion sensor also includes an ambient light-sensing element configured to generate a second output based on received visible light. The ambient light-sensing element provides information used to perform a quality check on information output from the IR element (e.g., to rule out "false positive" outputs from the IR sensing element).

The following list of abbreviations, acronyms, and terms is provided to assist in comprehending the current disclosure, and is not provided as a limitation.

ALS—Ambient Light Sensor
HDPE—High-density Polyethylene
IR—Infrared

FIG. 1 shows an example sensor 100, which can include hardware in addition to the specific physical sensor which is configured to obtain information about the sensor's environment. The sensor 100 can include a bus 102 configured to enable data communication between couple major components of the sensor 100, such as an environmental sensor 104, a processor 106, a memory 108, a communication interface 110, a user interface 112, the like, or a combination thereof. One or more components of the sensor 100 can be implemented in a single physical arrangement, such as where multiple components are implemented on a single integrated circuit. Sensors can include other components, and/or may not include all of the illustrative components shown.

The environmental sensor 104 can be a photodiode-augmented IR sensor 200, a sensor as described herein, the like, or a combination thereof. The environmental sensor 104 obtains a corresponding type of information about the environment in which the environmental sensor 104 is located.

The processor 106 can receive and analyze data obtained by the environmental sensor 104, control operation of other components of the sensor 100, and process communication between the sensor 100 and other devices. The processor 106 can execute instructions stored in a memory 108. The processor 106 can be a general purpose processor and/or an Application Specific Integrated Circuit (ASIC).

The memory 108 can store environmental data obtained by the environmental sensor 104. The memory 108 can be a Random Access Memory (RAM), a Read Only Memory (ROM), flash RAM, a computer-readable storage medium, the like, or a combination thereof.

A communication interface 110, such as a Wi-Fi or other wireless interface, Ethernet, or other local network interface, or the like can be configured to enable communication by the sensor 100 with other devices. The communication interface 110 can be configured to provide a connection to a remote device via a wired or wireless connection. The communication interface 110 can provide the connection using any suitable technique and protocol as will be readily understood by one of skill in the art, including digital cellular telephone, Wi-Fi, Bluetooth®, near-field communications (NFC), the like, or a combination thereof. For example, the communication interface 110 can enable the sensor 100 to communicate with a computer via one or more local, wide-area, or other communication networks, as described in further detail herein.

A user interface (UI) 112 can provide information to and/or receive input from a user of the sensor 100. The UI 112 can be configured to couple to one or more controllers. The UI 112 can be configured to couple to one or more user input devices, such as a keyboard, a mouse, a touch screen, the like, or a combination thereof. The UI 112 can include, for example, a speaker to output an audible alarm when an event is detected by the sensor 100. The UI 112 can include a light (e.g., a light-emitting diode) configured to be activated when an event is detected by the sensor 100. The UI 112 can have relatively minimal features (e.g., a limited-output display), or the UI 112 can be a full-featured interface (e.g., a touchscreen).

Figure 2:
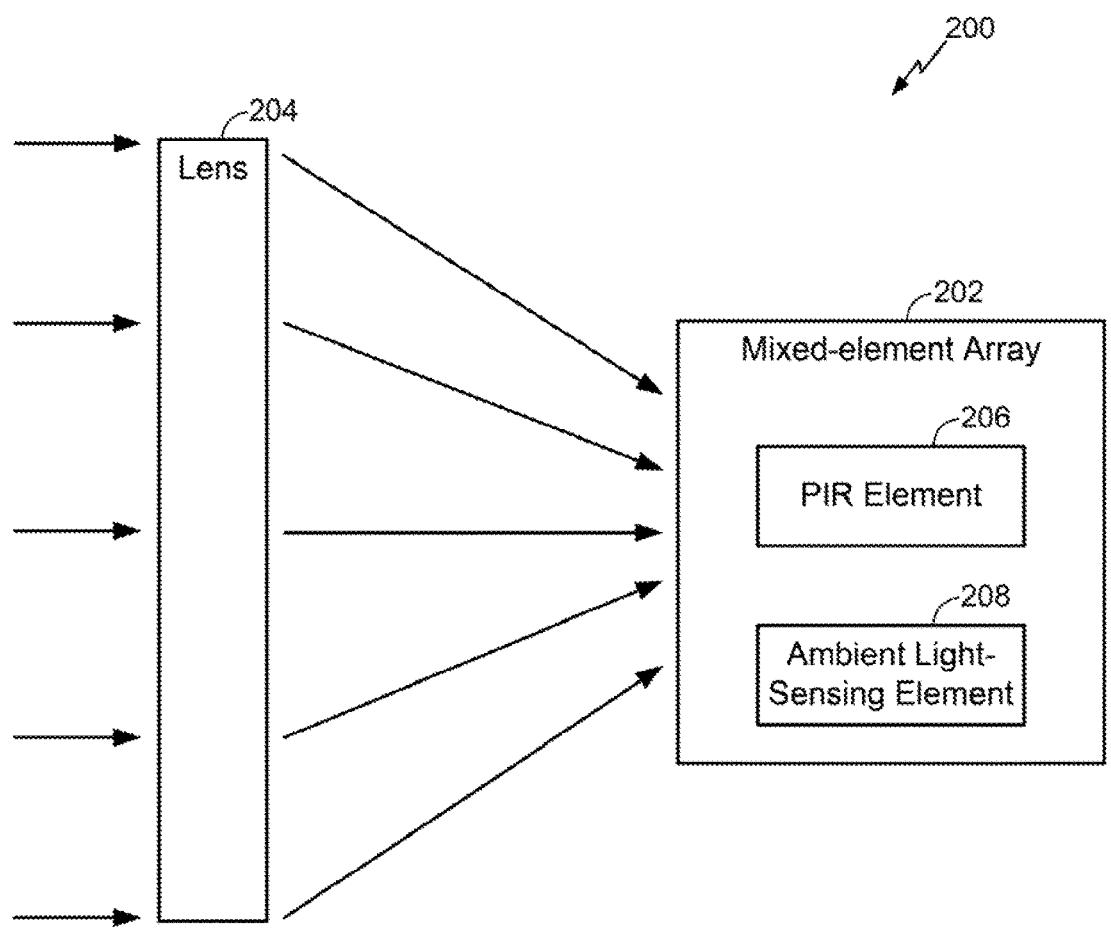
FIG. 2 shows a photodiode-augmented IR sensor according to an example of the disclosed subject matter.

FIG. 2 depicts a Photodiode-Augmented IR sensor 200. The Photodiode-Augmented IR sensor 200 includes a mixed-element array 202 and a lens 204. The mixed-element array includes an IR element 206. The IR element 206 can be any sensor which is sensitive to the IR wavelengths associated with human body heat (e.g., approximately 10 micrometers). The IR element 206 can include a thermopile, a quantum photodiode, a pyroelectric IR sensor, the like, or a combination thereof. The IR element 206 is configured to generate a first output based on received IR radiation impinging on the IR element 206. The IR element 206 can detect IR energy in a mid-band IR range. The mid-band IR range includes IR radiation having a wavelength between substantially six microns and a wavelength of substantially twelve microns, and all ranges inclusive therein. Humans typically emit IR radiation at a wavelength of substantially ten microns.

The mixed-element array 202 also includes an ambient light-sensing element 208. The ambient light-sensing element 208 is substantially collocated with the IR element 206, so that incident light is sensed by the ambient light-sensing element 208 and the IR element 206 at substantially the same time. The ambient light-sensing element 208 can be configured to sense near-IR wavelengths, visible wavelengths, ultraviolet wavelengths, wavelengths the IR sensor 206 is not configured to sense, the like, or a combination thereof. The near-IR range can include radiation having a wavelength ranging from substantially four microns to substantially seven microns, and all ranges inclusive therein. The ambient light-sensing element 208 is configured to generate a second output based on received visible light impinging on the ambient light-sensing element 208. The ambient light-sensing element 208 can be a photodiode (such as a PIN photodiode), an ambient light sensor (ALS), a thermopile (e.g., a thermopile configured to sense mid-IR radiation), the like, or a combination thereof.

Light from the sun contains a broad spectrum of wavelengths including both visible and non-visible wavelengths. While sunlight can trigger false IR sensor readings, the false IR sensor readings can be determined as being false by simultaneously sensing other wavelengths of light which are produced by the sun but which are not emitted by people, for example visible light, near-IR light, and UV light. A human body nominally produces body heat which produces IR radiation at approximately a ten micron wavelength. The human body does not produce visible, UV, or near-IR light on its own. Thus, the ambient light-sensing element 208 can be configured to provide information which can be used to perform a quality check on information from the IR element 206. The quality check can include ruling out "false positive" outputs from the IR element 206.

The lens 204 can include a plurality of lenslets configured to direct the received IR radiation and configured to direct the received visible light. Thus, the mixed-element array can detect both IR radiation and visible ambient light through the same lens. The lens 204 can be a Fresnel lens having a plurality of lenslets. The plurality of lenslets can have a focal point substantially in a center of the mixed-element array. Using lenslets can improve the Photodiode-Augmented IR sensor's 200 ability to sense changes from one IR element to another IR element over time. The lens 204 can be fabricated from a material which can pass both IR energy and visible light energy (i.e., wavelengths to which the IR element 206 is sensitive and wavelengths to which the ambient light-sensing element 208 is sensitive). The lens 204 can be comprised of one or more of high-density polyethylene (HDPE) (e.g., thin-walled HDPE), germanium, a mid-IR transmissive material, a UV transmissive material, a near-IR transmissive material, a material transmissive to visible light, a translucent material, silicon, chalcogenide glass, the like, or a combination thereof.

Figure 3:
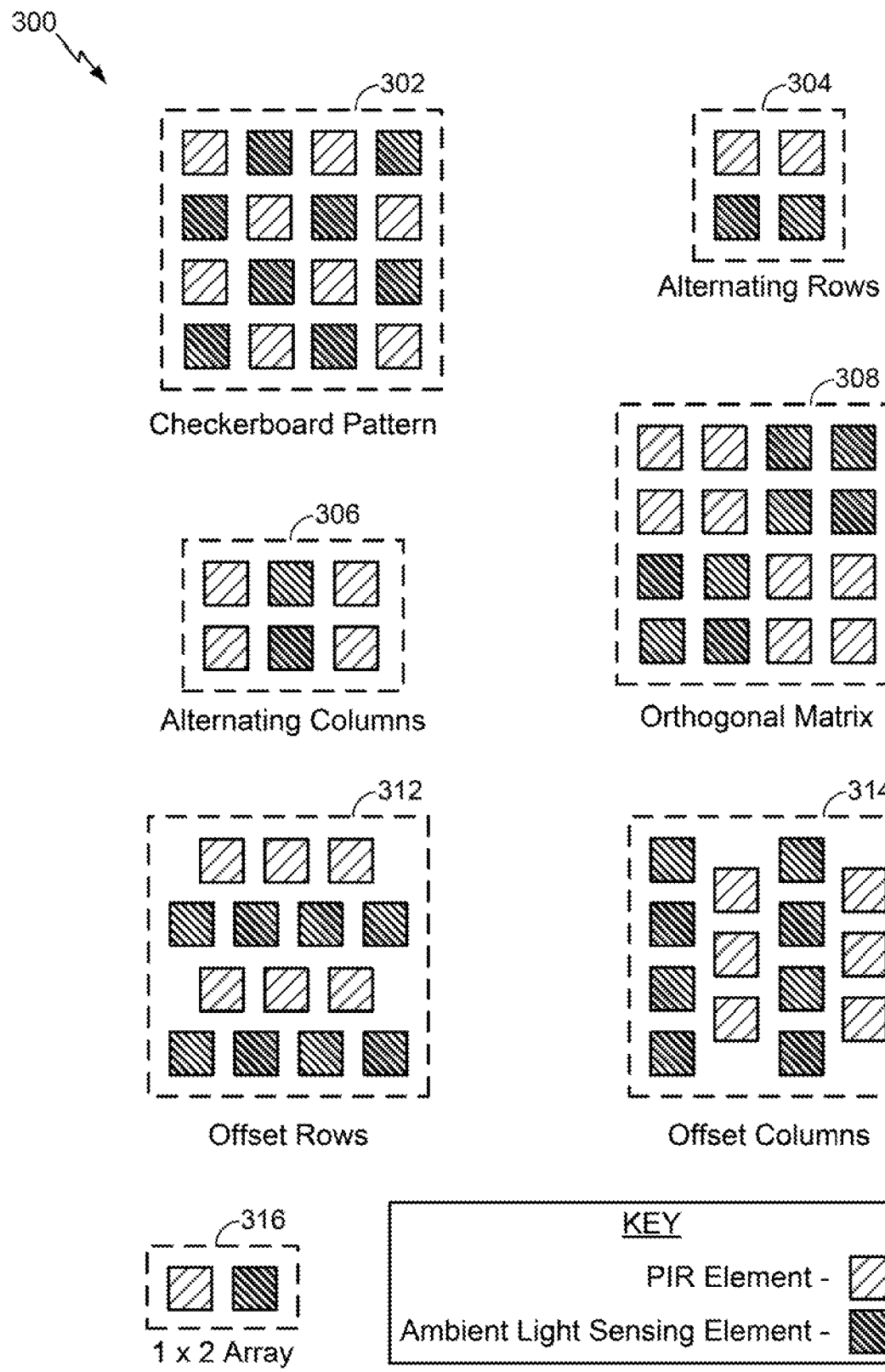
FIG. 3 shows example mixed-element arrays according to examples of the disclosed subject matter.

FIG. 3 depicts example element array configurations 300. The mixed-element array 202 can include a plurality of IR elements (e.g., the IR element 206) and a plurality of ambient light-sensing elements (e.g., the ambient light-sensing element 208). The plurality of the IR elements and the plurality of ambient light-sensing elements can be arranged in at least one of the element array configurations 300: in a checkerboard pattern 302, with alternating rows 304, with alternating columns 306, in an orthogonal matrix 310, in a substantially circular array, a substantially semicircular array, the like, or a combination thereof. The plurality of the IR elements and the plurality of ambient light-sensing elements can be arranged with every other row being offset 312, with every other column being offset 314, the like, or a combination thereof. The mixed-element array can have dimensions of at least one-by-two (e.g., the one-by-two array 316). In an example, the mixed-element array can have a two-by-two array of two IR elements and two ambient light-sensing elements. In an example, the mixed-element array can have a one-by-one array of a single ambient light-sensing element. The numbers of elements and the orientations of elements depicted in FIG. 3 are illustrative, and not limiting.

Figure 4:
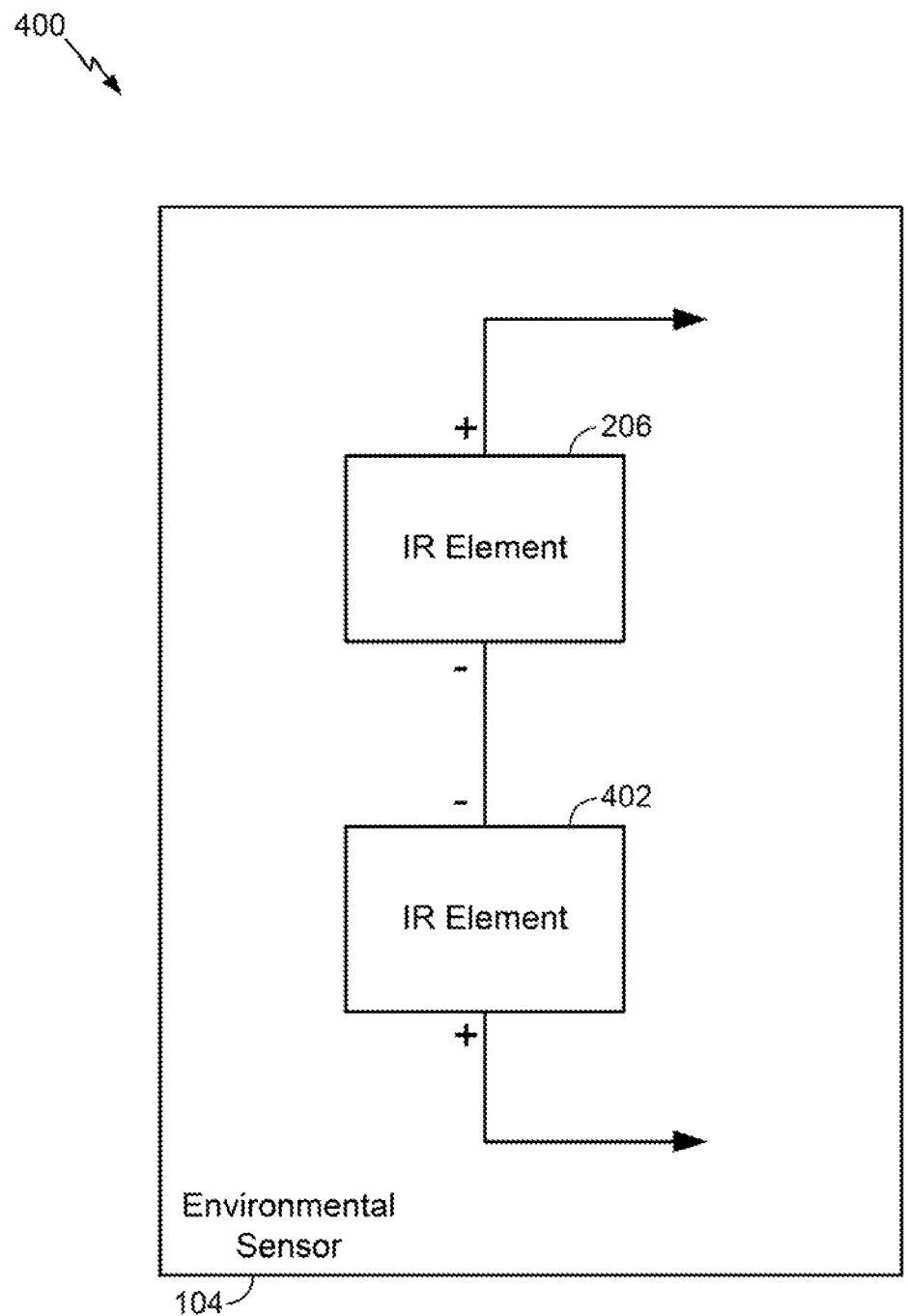
FIG. 4 shows an example coupling of multiple mixed-element arrays according to an example of the disclosed subject matter.

FIG. 4 depicts an optional arrangement 400 of the environmental sensor 104, where the environmental sensor 104 includes the IR element 206 (i.e., a first IR element), as well as a second IR element 402. The second IR element 402 can include a second lens including a second plurality of lenslets configured to direct received IR radiation. Coupling the outputs in an inverted manner causes the environmental sensor 104 to provide a differential output which mitigates respective essentially constant outputs due to essentially constant ambient IR radiation.

Figure 5A:
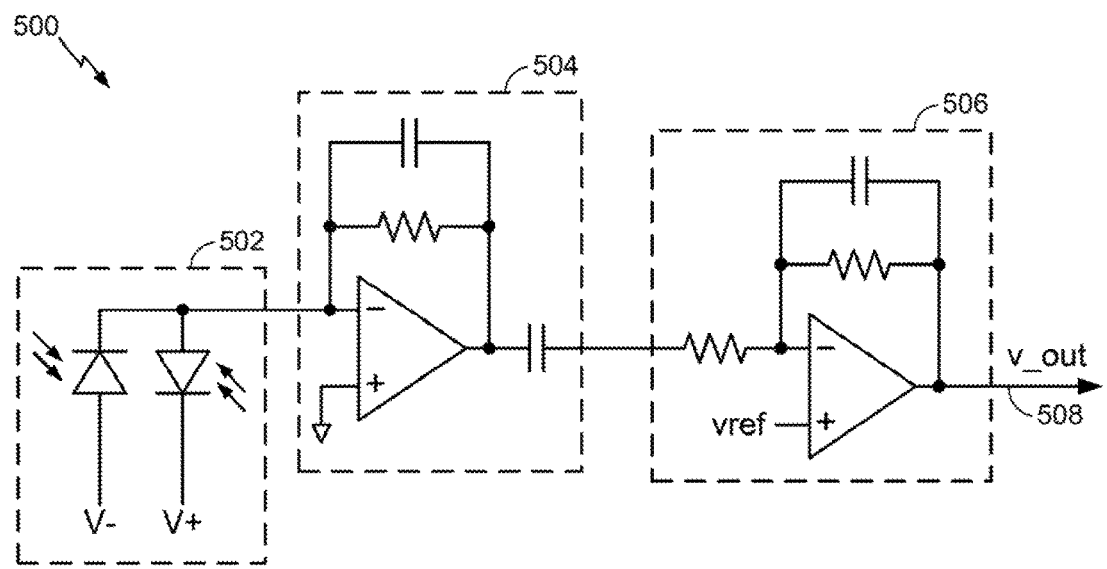
FIGS. 5A-5B show circuits configured to process outputs of a mixed-element array according to examples of the disclosed subject matter.

FIG. 5A depicts a first circuit 500 configured to produce a bandpass-filtered output indicating an instantaneous change in IR radiation level, or an instantaneous change in ambient light level. The first circuit 500 is configured to process the first output, the second output, the like, or a combination thereof. The first circuit 500 includes at least two incident radiation sensors 502, such as IR sensors or ambient light-sensing elements, coupled in parallel with reverse polarity. Coupling in parallel with reverse polarity rejects common mode components (e.g., of the first output and the second output). The parallel-coupled incident radiation sensors 502 produce an output coupled to a current to voltage (I to V) conversion circuit 504 configured as a high pass filter (i.e., a differentiator). An output of the current to voltage conversion circuit 504 is coupled to an amplifier 506 configured as a low pass filter. Thus, the first circuit 500 is configured to produce a bandpass-filtered output 508 indicating an instantaneous change in IR radiation level, or an instantaneous change in ambient light level.

Figure 5B:
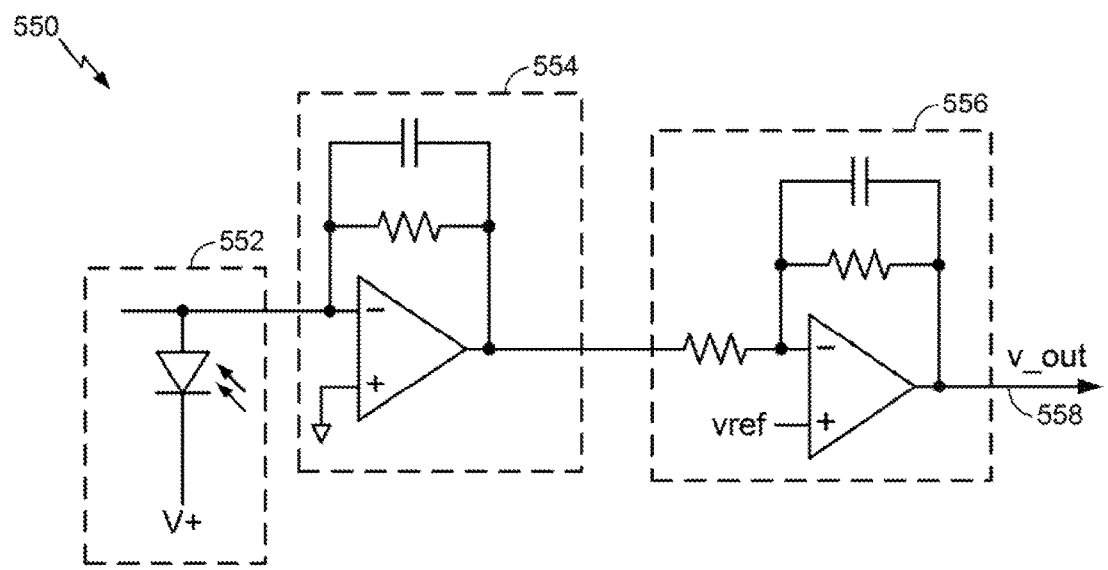

FIG. 5B depicts a second circuit 550 configured to produce a determination as to whether current conditions are day or night. The second circuit 550 includes one or more incident radiation sensors 552, such as IR sensors or ambient light-sensing elements producing the first output (or the second output). The one or more incident radiation sensors 552 are coupled to an input of a current to voltage (I to V) conversion circuit 554. An output of the current to voltage conversion circuit 554 is coupled to an amplifier 556 configured as a low pass filter. Thus, the second circuit 550 produces an output 558 proportional to an IR radiation level, or an ambient light level. The second circuit 550 can be configured to output a determination as to whether current conditions are day or night. The second circuit 550 can be configured to output a determination as to whether a light is on or off (e.g., inside a structure or outside a structure).

Figure 6:
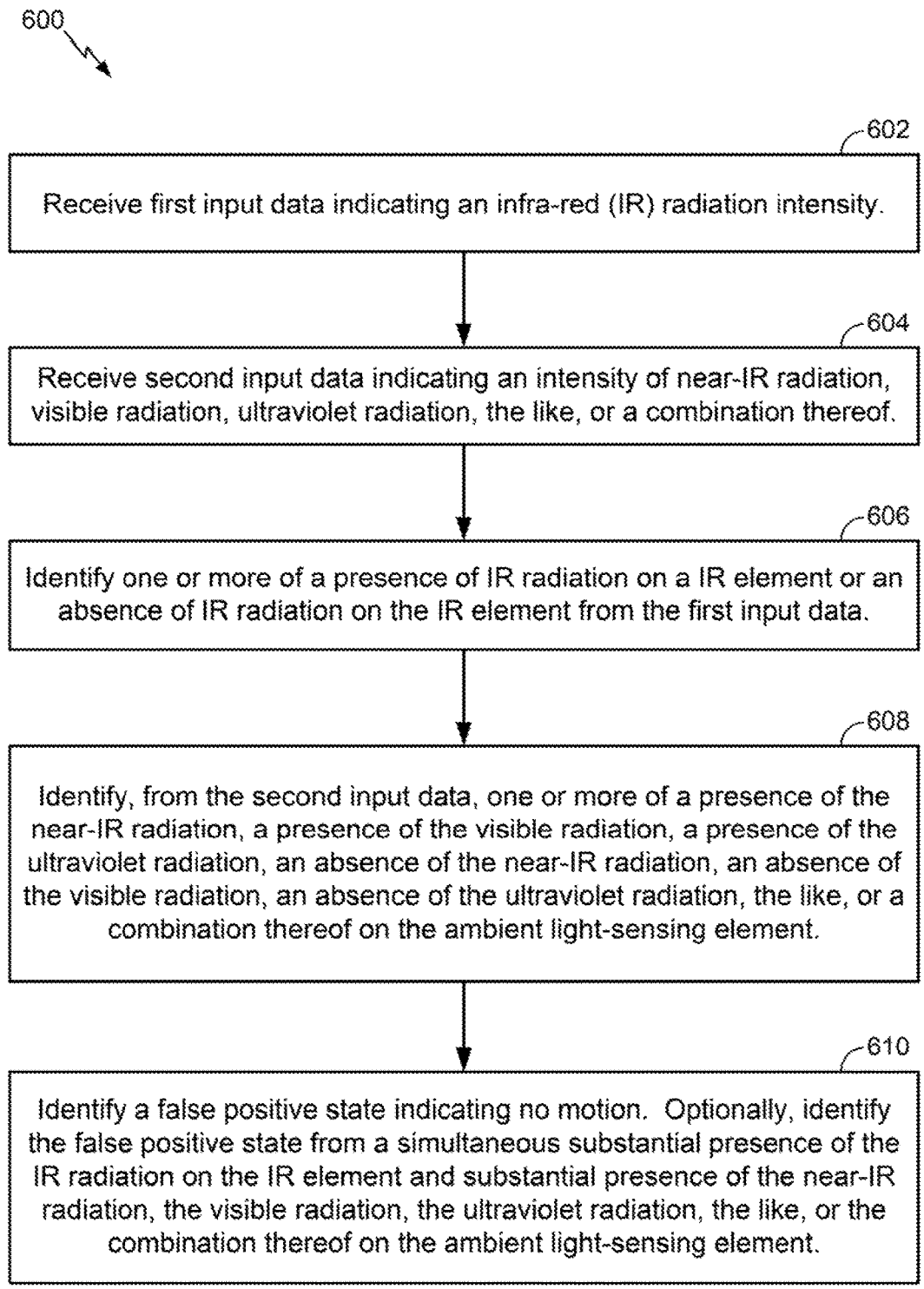
FIG. 6 shows a flowchart depicting a method for processing infra-red (IR) motion sensor information according to an example of the disclosed subject matter.

FIG. 6 depicts a flowchart of a method 600 for processing photodiode-augmented IR sensor information. The method 600 can be performed at least in part by the processor 106, a controller 708, a remote system 710, a processor 804, a server 908, a remote platform 912, the like, or a combination thereof.

In block 602, first input data indicating an IR radiation intensity is received (e.g., from the IR element 206).

In block 604, second input data indicating an intensity of near-IR radiation, visible radiation, ultraviolet radiation, the like, or a combination thereof is received (e.g., from the ambient light-sensing element 208).

In block 606, one or more of a presence of IR radiation on an IR element or an absence of IR radiation on the IR element are identified from the first input data. An intensity of IR radiation on the IR element or a lack of intensity of IR radiation on the IR element can be determined from the first input data.

In block 608, one or more of a presence of the near-IR radiation, a presence of the visible radiation, a presence of the ultraviolet radiation, an absence of the near-IR radiation, an absence of the visible radiation, an absence of the ultraviolet radiation, the like, or a combination thereof on the ambient light-sensing element are identified from the second input data. An intensity of the near-IR radiation, the visible radiation, the ultraviolet radiation, the like, or the combination thereof on the ambient light-sensing element can be determined from the second input data. A lack of intensity of the near-IR radiation, the visible radiation, the ultraviolet radiation, the like, or the combination thereof on the ambient light-sensing element can be determined from the second input data.

In block 610, a false positive state indicating no motion is identified. For example, the false positive state can be identified from a simultaneous substantial presence of IR radiation on the IR element and substantial presence of the near-IR radiation, the visible radiation, the ultraviolet radiation, the like, or the combination thereof on the ambient light-sensing element. In the case of sunlight (direct, reflected, or both) impinging on the IR element, the IR element responds to this input signal (i.e., the sunlight)

indicating an alarm. But, substantially simultaneously, the ambient light-sensing element detects a change in input far greater than a change in input resulting from a person walking in the range of the ambient light-sensing element. The second input indicating the near-IR radiation, the visible radiation, the ultraviolet radiation, the like, or the combination thereof acts as a quality check on the decision (e.g., an alarm indication) made from the first input data. Thus, processing of the first input data can be modified by the second input data. This processing advantageously enables using the motion sensor during daylight hours.

Moreover, a negative state indicating no motion can be identified from a simultaneous substantial absence of IR radiation on the IR element and substantial presence of visible light on the ambient light-sensing element. The negative state indicating no motion can be identified from a simultaneous substantial absence of IR radiation on the IR element and substantial presence of visible light on the ambient light-sensing element.

A positive state indicating motion can be identified from a simultaneous substantial presence of IR radiation on the IR element and substantial absence of visible light on the ambient light-sensing element (e.g., due to a heat flare likely due to a person). In response to identifying the positive state, turning on one or more of a camera, a light, an alarm, or a combination thereof can be initiated, performed, the like, or a combination thereof. An occupancy of a structure (e.g., a home, an office, an occupiable building, the like, or a combination thereof) can thus be gauged in response to identifying the positive state. In response to identifying the positive state, an action relating to security, occupancy, proximity identification, the like, or a combination thereof can be performed.

A state of ambient lighting in an atmosphere adjacent to the mixed-element array can be identified from a presence of visible light on the ambient light-sensing element.

One or more of the following can be identified from the first input and the second input: 1.) a transition from a substantial absence of the IR radiation on the IR element to a substantial presence of the IR radiation on the IR element, 2.) a transition from a substantial presence of the IR radiation on the IR element to a substantial absence of the IR radiation on the IR element, 3.) a transition from a substantial absence of the visible light on the ambient light-sensing element to a substantial presence of the visible light on the ambient light-sensing element, 4.) a transition from a substantial presence of the visible light on the ambient light-sensing element to a substantial absence of the visible light on the ambient light-sensing element, or 5.) a combination thereof.

Figure 7:
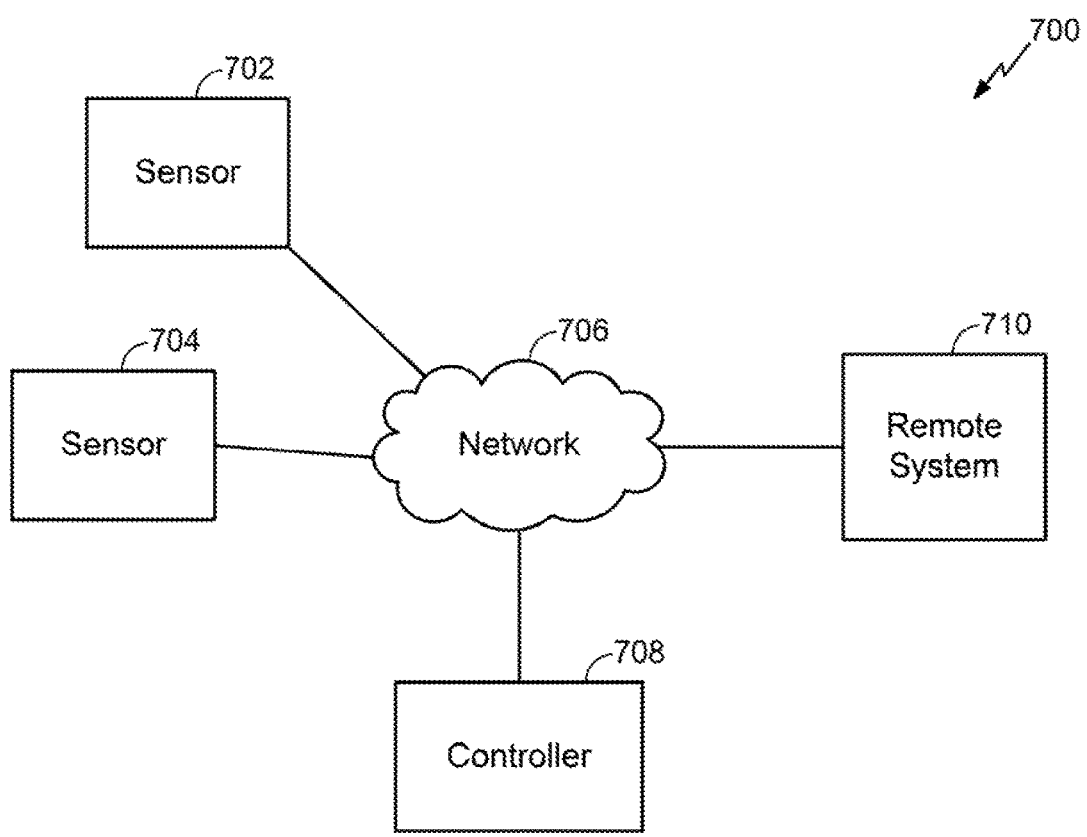
FIG. 7 shows an example of a sensor system according to an example of the disclosed subject matter.

FIG. 7 shows an example of a sensor network 700, which can be implemented over any suitable wired and/or wireless communication networks. One or more sensors 702, 704 can communicate via a local network 706, such as a Wi-Fi or other suitable network, with each other and/or with the controller 708.

In general, a sensor, such as the sensors 702, 704, is any device that can obtain information about the sensor's environment. The sensors 702, 704 can include a photodiode-augmented IR motion sensor. Sensors can be described by the type of information they collect. Sensor types can include motion, smoke, carbon monoxide, proximity, temperature, time, physical orientation, acceleration, location, entry, presence, pressure, light, sound, and the like. A sensor also can be described in terms of the particular physical device that obtains the environmental information. An accelerometer can obtain acceleration information, and thus can be used as a general motion sensor and/or an acceleration sensor. A sensor also can be described in terms of the specific hardware components used to implement the sensor. For example, a temperature sensor can include a thermistor, thermocouple, resistance temperature detector, integrated circuit temperature detector, or a combination thereof. A sensor also can be described in terms of a function or functions the sensor performs within the sensor network 700, such as a smart home environment. For example, a sensor can operate as a security sensor when the sensor is used to determine security events such as unauthorized entry. A sensor can operate with different functions at different times, such as where a motion sensor is used to control lighting in a smart home environment when an authorized user is present, and is used to alert to unauthorized or unexpected movement when no authorized user is present, or when an alarm system is in an armed state, or the like. In some cases, a sensor can operate as multiple sensor types sequentially or concurrently, such as where a temperature sensor is used to detect a change in temperature, as well as the presence of a person or animal. A sensor also can operate in different modes at the same or different times. For example, a sensor can be configured to operate in one mode during the day and another mode at night. As another example, a sensor can operate in different modes based upon a state of a home security system or a smart home environment, or as otherwise directed by such a system. A sensor can include multiple sensors or sub-sensors, such as where a position sensor includes both a global positioning sensor (GPS) as well as a wireless network sensor, which provides data that can be correlated with known wireless networks to obtain location information. Multiple sensors can be arranged in a single physical housing, such as where a single device includes movement, temperature, magnetic, and/or other sensors. Such a housing also can be referred to as a sensor or a sensor device. For clarity, sensors are described with respect to the particular functions they perform and/or the particular physical hardware used, when such specification is necessary for understanding of the examples disclosed hereby.

In some configurations, two or more sensors can generate data which can be used by a processor to generate a response and/or infer a state of an environment. For example, an ambient light sensor can determine a light intensity (e.g., darkness) (e.g., less than 60 lux) in a room in which the ambient light sensor is located. A microphone can detect a sound above a set threshold, such as 60 dB. The processor can determine, based on the data generated by both sensors, that the processor should activate all of the lights in the room. In the event the processor only received data from the ambient light sensor, the processor may not have any basis to alter the state of the lighting in the room. Similarly, if the processor only received data from the microphone, it may not make sense to activate the lights in the room because it is daytime or bright in the room (e.g., the lights are already on). As another example, two or more sensors can communicate with one another. Thus, data generated by multiple sensors simultaneously or nearly simultaneously can be used to determine a state of an environment and, based on the determined state, generate a response.

Data generated by one or more sensors can indicate patterns in the behavior of one or more users and/or an environment state over time, and thus can be used to "learn" such characteristics. For example, data generated by an ambient light sensor in a room and the time of day can be stored in a local or remote storage medium. A processor in communication with the storage medium can compute a behavior based on the data generated by the light sensor. The light sensor data can indicate that the amount of light detected increases until an approximate time or time period, such as 3:30 PM, and then declines until another approximate time or time period, such as 5:30 PM, at which time there an abrupt increase in the amount of light is detected. In many cases, the amount of light detected after the second time period can be either below a dark level of light (e.g., under or equal to 60 lux) or bright (e.g., equal to or above 400 lux). In this example, the data can indicate that after 5:30 PM, an occupant is turning on/off a light as the occupant of the room in which the sensor is located enters/leaves the room. At other times, the light sensor data can indicate that no lights are turned on/off in the room. The system, therefore, can learn that occupants patterns of turning on and off lights, and can generate a response to the learned behavior. For example, at 5:30 PM, a smart home environment or other sensor network can automatically activate the lights in the room if the smart home environment or the other sensor network detects an occupant in proximity to the home. In some examples, such behavior patterns can be verified using other sensors. Continuing the example, user behavior regarding specific lights can be verified and/or further refined based upon states of, or data gathered by, smart switches, outlets, lamps, motion sensors, and the like.

Sensors can communicate via a communication network, such as a conventional wireless network, and/or a sensor-specific network through which sensors can communicate with one another and/or with dedicated other devices. In some configurations one or more sensors can provide information to one or more other sensors, to a central controller, or to any other device capable of communicating on a network with the one or more sensors. A central controller can be general- or special-purpose. For example, one type of central controller is a home automation network, which collects and analyzes data from one or more sensors within the home. Another example of a central controller is a special-purpose controller which is dedicated to a subset of functions, such as a security controller which collects and analyzes sensor data primarily or exclusively as the sensor data relates to various security considerations for a location. A central controller can be located locally with respect to the sensors with which the central controller communicates and from which the central controller obtains sensor data, such as in the case where the central controller is positioned within a home that includes a home automation and/or sensor network. Alternatively or in addition, a central controller can be remote from the sensors, such as where the central controller is implemented as a cloud-based system which communicates with multiple sensors, which can be located at multiple locations and can be local or remote with respect to one another.

The controller 708 can be a general- or special-purpose computer. The controller can, for example, receive, aggregate, and/or analyze environmental information received from the sensors 702, 704. The sensors 702, 704 and the controller 708 can be located locally to one another, such as within a single dwelling, office space, building, room, or the like, or they can be remote from each other, such as where the controller 708 is implemented in the remote system 710 such as a cloud-based reporting and/or analysis system. Alternatively or in addition, sensors can communicate directly with the remote system 710. The remote system 710 can, for example, aggregate data from multiple locations, provide instructions, provide software updates, and/or provide aggregated data to the controller 708 and/or the sensors 702, 704.

The sensor network 700 can be implemented in a smart-home environment. The smart-home environment can include a structure, a house, office building, garage, mobile home, or the like. Devices in the smart home environment, such as the sensors 702, 704, the controller 708, and the network 706 can be integrated into a smart-home environment that does not include an entire structure, such as an apartment, a condominium, an office space, the like, or a combination thereof. The smart home environment can control and/or be coupled to devices outside of the structure. For example, one or more of the sensors 702, 704 can be located outside the structure, for example, at one or more distances from the structure. One or more of the devices in the smart home environment need not be located within the structure. For example, the controller 708, which can receive input from the sensors 702, 704, can be located outside of the structure. The structure can include a plurality of rooms, separated at least partly from each other via walls. The walls can include interior walls or exterior walls. Each room can further include a floor and a ceiling. Devices, such as the sensors 702, 704, can be mounted on, integrated with, and/or supported by a wall, floor, or ceiling of the structure.

The sensor network 700 can include a plurality of devices, including intelligent, multi-sensing, network-connected devices, which can integrate seamlessly with each other and/or with a central server or a cloud-computing system (e.g., the controller 708 and/or the remote system 710) to provide home-security and smart-home features. The smart-home environment can include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells can be the sensors 702, 704 shown in FIG. 7.

As another example, a smart doorbell can control doorbell functionality, detect a person's approach to or departure from a location (e.g., an outer door to the structure), and announce a person's approach or departure from the structure via audible and/or visual message output by a speaker and/or a display coupled to, for example, the controller 708.

In some examples, the sensor network 700 can include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs can be or include one or more of the sensors 702, 704 shown in FIG. 7. A smart wall switch can detect ambient lighting conditions, and control a power and/or dim state of one or more lights. For example, a sensor such as sensors 702, 704, can detect ambient lighting conditions, and a device such as the controller 708 can control the power to one or more lights (not shown) in the smart-home environment. Smart wall switches can also control a power state or speed of a fan, such as a ceiling fan. For example, sensors 702, 704 can detect the power and/or speed of a fan, and the controller 708 can adjust the power and/or speed of the fan, accordingly. Smart wall plugs can control supply of power to one or more wall plugs (e.g., such that power is not supplied to the plug if nobody is detected to be within the smart-home environment). For example, one of the smart wall plugs can control supply of power to a lamp (not shown).

In examples of the disclosed subject matter, a smart-home environment can include one or more intelligent, multi-sensing, network-connected entry detectors (e.g., "smart entry detectors"). Such detectors can be or include one or more of the sensors 702, 704 shown in FIG. 8. The illustrated smart entry detectors (e.g., sensors 702, 704) can be disposed at one or more windows, doors, and other entry points of the smart-home environment for detecting when a window, door, or other entry point is opened, broken, breached, and/or compromised. The smart entry detectors can generate a corresponding signal to be provided to the controller 708 and/or the remote system 710 when a window or door is opened, closed, breached, and/or compromised. In some examples of the disclosed subject matter, the alarm system, which can be included with the controller 708 and/or coupled to the network 706 may not arm unless all smart entry detectors (e.g., sensors 702, 704) indicate that all doors, windows, entryways, and the like are closed and/or that all smart entry detectors are armed.

The smart doorbells, the smart wall switches, the smart wall plugs, the smart entry detectors, the keypads, and other devices of a smart-home environment (e.g., as illustrated as sensors 702, 704 of FIG. 7 can be communicatively coupled to each other via the network 707, and to the controller 708 and/or the remote system 710 to provide security, safety, and/or comfort for a user in the smart home environment).

A user can interact with one or more of the network-connected smart devices (e.g., via the network 706). For example, a user can communicate with one or more of the network-connected smart devices using a computer (e.g., a desktop computer, laptop computer, tablet, or the like) or other portable electronic device (e.g., a smartphone, a tablet, a key FOB, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key Fobs with the smart-home environment (e.g., with the controller 708). Such registration can be made at a central server (e.g., the controller 708 and/or the remote system 710) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user can also use their registered electronic device to control the network-connected smart devices when the user is located inside the smart-home environment.

Alternatively, or in addition to registering electronic devices, the smart-home environment can make inferences about which individuals live in the home and are therefore users and which electronic devices are associated with those individuals. As such, the smart-home environment can "learn" who is a user (e.g., an authorized user) and permit the electronic devices associated with those individuals to control the network-connected smart devices of the smart-home environment (e.g., devices communicatively coupled to the network 706), in some examples including sensors used by or within the smart-home environment. Various types of notices and other information can be provided to users via messages sent to one or more user electronic devices. For example, the messages can be sent via email, short message service (SMS), multimedia messaging service (MMS), unstructured supplementary service data (USSD), the like, any other practicable type of messaging services and/or communication protocols, or a combination thereof.

A smart-home environment can include communication with devices outside of the smart-home environment but within a proximate geographical range of the home. For example, the smart-home environment can include an outdoor lighting system (not shown) that communicates information through the communication network 706 or directly to a central server or cloud-computing system (e.g., the controller 708 and/or the remote system 710) regarding detected movement and/or presence of people, animals, and any other objects and receives back commands for controlling the lighting accordingly.

The controller 708 and/or the remote system 710 can control the outdoor lighting system based on information received from the other network-connected smart devices in the smart-home environment. For example, in the event, any of the network-connected smart devices, such as smart wall plugs located outdoors, detect movement at night time, the controller 708 and/or the remote system 710 can activate the outdoor lighting system and/or other lights in the smart-home environment.

In some configurations, the remote system 710 can aggregate data from multiple locations, such as multiple buildings, multi-resident buildings, and individual residences within a neighborhood, multiple neighborhoods, and the like. In general, multiple controllers 708 can provide information to the remote system 710. The multiple controllers 708 can provide data directly from one or more sensors as previously described, or the data can be aggregated and/or analyzed by local controllers such as the controller 708, which then communicates with the remote system 710. The remote system can aggregate and analyze the data from multiple locations, and can provide aggregate results to each location. For example, the remote system 710 can examine larger regions for common sensor data or trends in sensor data, and provide information on the identified commonality or environmental data trends to each of the multiple controllers 708.

Figure 8:
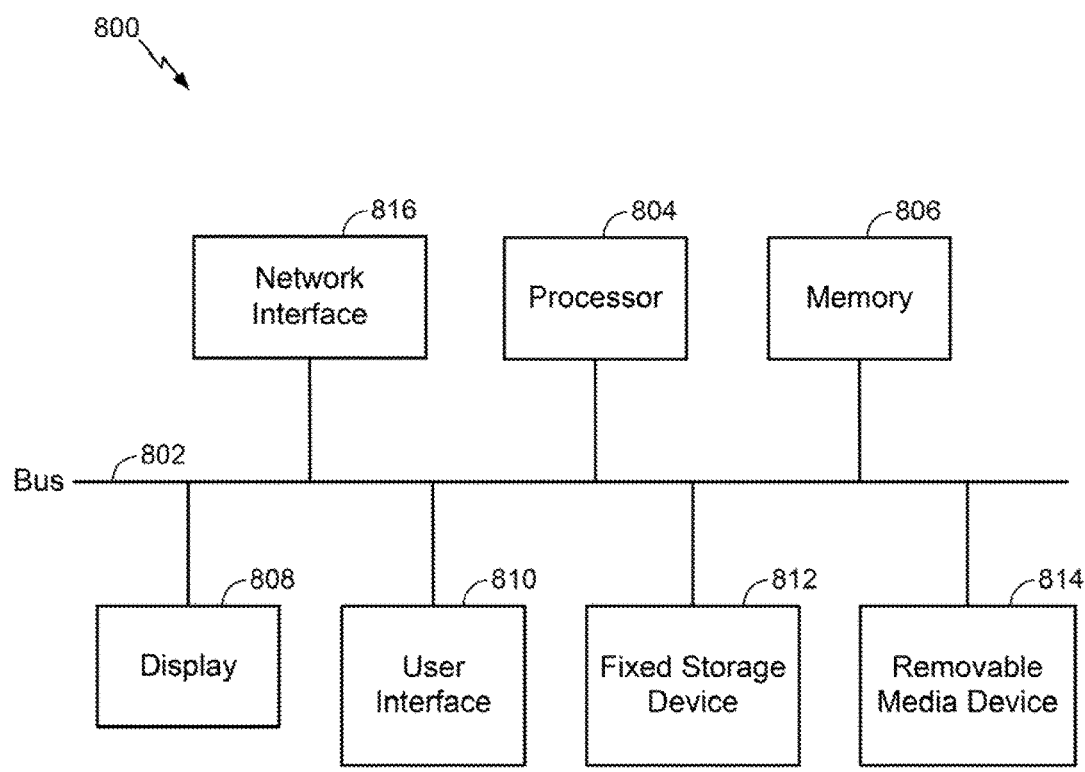
FIG. 8 shows a computing device according to an example of the disclosed subject matter.

FIG. 8 depicts an example computing device 800 configured to implement examples of the disclosed subject matter. The device 800 can be configured as a control device (e.g., as the controller 708, the remote system 710, the like, or a combination thereof). The device 800 can be configured as a device including sensors (e.g., the sensors 702, 704). Alternatively or in addition, the device 800 can be, for example, a desktop or laptop computer, or a mobile computing device such as a smart phone, tablet, or the like. The device 800 can include a bus 802 configured to enable data communication between couple major components of the device 800, such as the processor 804, a memory 806, a display 808 such as a display screen, a user interface 810, a fixed storage device 812, a removable media device 814, a network interface 816, the like, or a combination thereof.

The processor 804 can be a general purpose processor and/or an ASIC. In an example, the processor 804 can be configured in a manner similar to, or identical to, the processor 106.

The memory 806 can be a RAM, a ROM, flash RAM, a computer-readable storage medium, the like, or a combination thereof.

The user interface 810 can be configured to couple to one or more controllers. The user interface 810 can be configured to couple to one or more user input devices, such as a keyboard, a mouse, a touch screen, the like, or a combination thereof.

The fixed storage device 812 can be a hard drive, a flash memory device, the like, or a combination thereof. The fixed storage device 812 can be integral with the device 800 or can be separate and accessed through an interface.

The removable media device 814 can be an optical disk, flash drive, the like, or a combination thereof.

The network interface 816 can be configured to communicate with one or more remote devices (e.g., sensors such as the sensors 702, 704) via a suitable network connection. The network interface 816 can be configured to provide a connection to a remote server via a wired or wireless connection. The network interface 816 can provide the connection using any suitable technique and protocol as will be readily understood by one of skill in the art, including digital cellular telephone, Wi-Fi, Bluetooth®, NFC, the like, or a combination thereof. For example, the network interface 816 can allow the device to communicate with other computers via one or more local, wide-area, or other communication networks, as described in further detail herein.

Figure 9:
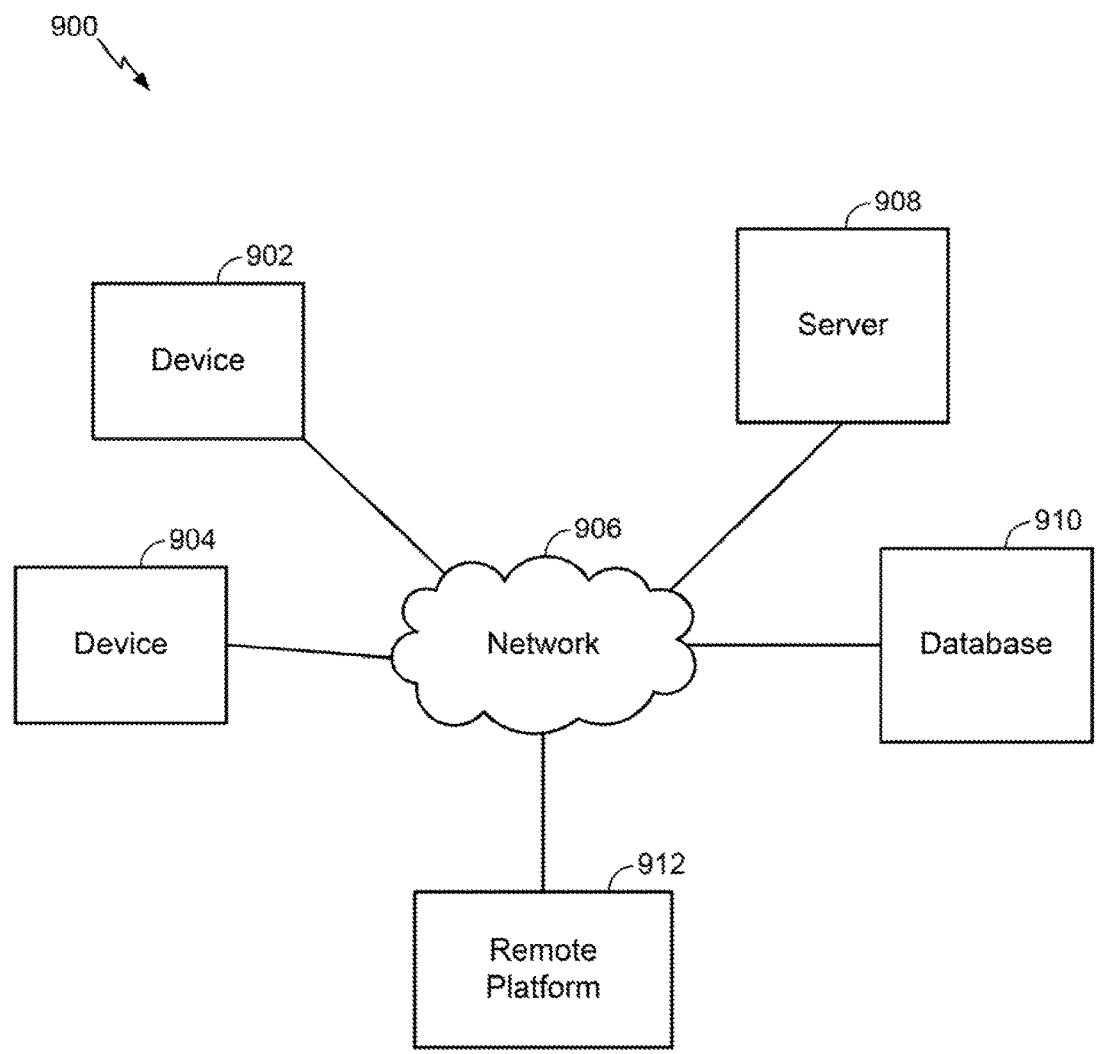
FIG. 9 shows an example network according to an example of the disclosed subject matter.

FIG. 9 shows an example network 900. The network 900 can include one or more devices 902, 904. The devices 902, 904 can be as a computer, a computing device, a smart phone, a tablet computing device, the like, or a combination thereof. The devices 902, 904 can couple to other devices via one or more networks 906. The network 906 can be a local network, wide-area network, the Internet, or any other suitable communication network or networks. The network 906 can be implemented on any suitable platform including wired and/or wireless networks. The devices 902, 904 can communicate with one or more remote devices, such as the server 908 and/or a database 910. The remote devices, such as a server 908 and/or a database 910 can be directly accessible by the devices 902, 904, or one or more other devices can provide intermediary access such as where the server 908 provides access to resources stored in the database 910. The devices 902, 904 also can access the remote platform 912 or services provided by the remote platform 912 such as cloud computing arrangements and services. The remote platform 912 can include the servers 908 and/or the database 910.

The term "example" can mean "serving as an example, instance, or illustration." Any example described as "example" is not necessarily to be construed as preferred over other examples. Likewise, the term "examples" does not require that all examples include the described feature, advantage, or operation. Use of the terms "in one example," "an example," and the like does not necessarily refer to the same example. Use of the terms "in one feature," "a feature," and the like does not necessarily refer to the same feature. Furthermore, a particular feature can be combined with one or more other features. Moreover, a particular structure can be combined with one or more other structures. At least a portion of the apparatus described hereby can be configured to perform at least a portion of a method described hereby.

The terms "connected," "coupled," and variations thereof, mean any connection or coupling between elements, either direct or indirect, and can include an intermediate element between two elements that are "connected" or "coupled" together via the intermediate element. Coupling and connection between the elements can be physical, logical, or a combination thereof. Elements can be "connected" or "coupled" together, for example, by one or more wires, cables, printed electrical connections, electromagnetic energy, the like, or a combination thereof. The electromagnetic energy can have a wavelength at a radio frequency, a microwave frequency, a visible optical frequency, an invisible optical frequency, the like, or a combination thereof, as is practicable. These are non-limiting and non-exhaustive examples.

The term "signal" can include any signal such as a data signal, an audio signal, a video signal, a multimedia signal, an analog signal, a digital signal, the like, or a combination thereof. Information and signals can be represented using any of a variety of different technologies and techniques. For example, data, an instruction, a process step, a process block, a command, information, a signal, a bit, a symbol, the like, or a combination thereof can be represented by a voltage, a current, an electromagnetic wave, a magnetic field, a magnetic particle, an optical field, an optical particle, the like, or any practical combination thereof, depending at least in part on the particular application, at least in part on a desired design, at least in part on corresponding technology, at least in part on like factors, or a combination thereof.

An element referred to as "first," "second," and so forth does not limit either the quantity or the order of those elements. Rather, these designations are used as a convenient method of distinguishing between two or more elements or instances of an element. Thus, a reference to first and second elements does not mean that only two elements can be employed, or the first element must necessarily precede the second element. Also, unless stated otherwise, a set of elements can comprise one or more elements. In addition, terminology of the form "at least one of: A, B, or C" or "one or more of A, B, or C" or "at least one of a group consisting of A, B, and C" can be interpreted as "A or B or C or any combination of these elements." For example, this terminology can include A, or B, or C, or A and B, or A and C, or A and B and C, or 2A, or 2B, or 2C, and so on.

The terminology used herein describes particular examples and is not intended to be limiting. The singular forms "a," "an," and "the" include the plural forms as well, unless the context clearly indicates otherwise. In other words, the singular portends the plural, where practicable. Further, the terms "comprises," "comprising," "includes," and "including" specify a presence of a feature, an integer, a step, a block, an operation, an element, a component, the like, or a combination thereof, but do not necessarily preclude a presence or an addition of another feature, integer, step, block, operation, element, component, and the like.

Further, the example logical blocks, modules, circuits, steps, and the like, as described in the examples disclosed hereby, can be implemented as electronic hardware, computer software, or a combination of both, as is practicable. To clearly illustrate this interchangeability of hardware and software, example components, blocks, modules, circuits, and steps are described herein generally in terms of their functionality. Whether the functionality is implemented as hardware or software depends upon the particular application and design constraints imposed on an overall system. Skilled artisans can implement the described functionality in a manner tailored to a particular application. An implementation should not be interpreted as causing a departure from the scope of the present disclosure.

One or more examples provided hereby can include a non-transitory (i.e., a non-transient) machine-readable media and/or a non-transitory (i.e., a non-transient) computer-readable media storing processor-executable instructions (e.g., special programming) configured to cause a processor (e.g., a special-purpose processor) to transform the processor and any other cooperating devices into a machine (e.g., a special-purpose processor) configured to perform at least a part of a function described hereby and/or a method described hereby. Performing at least a part of a function described hereby can include initiating at least a part of a function described hereby. When implemented on a general-purpose processor, the processor-executable instructions can configure the processor to become a special-purpose device, such as by temporary (and/or permanent) creation of specific logic circuits within the processor, as specified by the instructions. In an example, a combination of at least two related method steps forms a sufficient algorithm. In an example, a sufficient algorithm constitutes special programming. In an example, any software that can cause a computer (e.g., a general-purpose computer, a special-purpose computer, etc.) to be configured to perform one or more function, feature, step algorithm, block, or combination thereof, constitutes special programming. A non-transitory (i.e., a non-transient) machine-readable media specifically excludes a transitory propagating signal. A non-transitory (i.e., a non-transient) machine-readable medium can include a hard drive, a universal serial bus drive, a RAM, a flash memory, a ROM, an erasable programmable read-only memory (EPROM), an electrically erasable programmable read-only memory (EEPROM), a register, a hard disk drive, a removable disk, a compact disc read-only memory (CD-ROM), the like. An example storage medium can be coupled to the processor such that the processor can read information from, and/or write information to, the storage medium. In an example, the non-transitory machine-readable medium can be integrated with a processor.

Further, examples are described in terms of sequences of actions to be performed by, for example, one or more element of a computing device, such as a processor. Examples can be implemented using hardware that can include a processor, such as a general purpose processor and/or an ASIC. Both a general purpose processor and an ASIC can be configured to initiate and/or perform at least a part of the disclosed subject matter. The processor can be coupled to a memory, such as a RAM, a flash memory, a ROM, an EPROM, an EEPROM, the like, or any other device capable of storing electronic information, such as a processor-executable instruction.

Nothing stated or depicted in this application is intended to dedicate any component, step, block, feature, object, benefit, advantage, or equivalent to the public, regardless of whether the component, step, block, feature, object, benefit, advantage, or the equivalent is recited in the claims. This description, for purpose of explanation, includes references to specific examples. However, the illustrative discussions herein (including in the claims) are not intended to be exhaustive or to limit examples of the disclosed subject matter to the precise forms disclosed. Many modifications and variations are possible in view of the teachings herein. The examples are chosen and described in order to explain the principles of examples of the disclosed subject matter and their practical applications, to thereby enable persons skilled in the art to utilize those examples as well as various examples with various modifications as may be suited to the particular use contemplated.

The invention claimed is:

1. A device, comprising:
 a mixed-element array including:
  a first infrared (IR) element configured to generate a first output based on first received IR radiation;
  a first ambient light-sensing element configured to generate a second output based on first received visible light;
  a second IR element configured to generate a third output based on second received IR radiation, the second IR element coupled in parallel with the first IR element with reverse polarity; and
  a second ambient light-sensing element configured to generate a fourth output based on second received visible light, the second ambient light-sensing element coupled in parallel with the first ambient light-sensing element with reverse polarity; and
 a first lens including a first plurality of lenslets configured to:
  direct the first received IR radiation to the first IR element; and
  direct the first received visible light to the first ambient light-sensing element.

2. The device of claim 1, wherein the mixed-element array includes:
 a plurality of IR elements including the first IR element; and
 a plurality of ambient light-sensing elements including the first ambient light-sensing element, wherein the plurality of IR elements and the plurality of ambient light-sensing elements are arranged in at least one of:
  a checkerboard pattern,
  alternating rows,
  alternating columns,
  an orthogonal matrix,
  a matrix with every other row being offset,
  a matrix with every other column being offset, or
  a combination thereof.

3. The device of claim 1, wherein the first ambient light-sensing element is a photodiode.

4. The device of claim 1, wherein the first lens is a Fresnel lens.

5. The device of claim 1, wherein the first plurality of lenslets has a focal point substantially in a center of the mixed-element array.

6. The device of claim 1, further comprising a processor configured to:
 receive the first output and the second output;
 identify, from the first output and the second output, one or more of a presence of IR radiation on the first IR element or an absence of IR radiation on the first IR element; and
 identify, from the first output and the second output, one or more of a presence of visible light on the first ambient light-sensing element or an absence of visible light on the first ambient light-sensing element.

7. The device of claim 6, wherein the processor is further configured to identify, from a simultaneous substantial presence of IR radiation on the first IR element and substantial presence of visible light on the first ambient light-sensing element, a false positive state indicating no motion.

8. The device of claim 6, wherein the processor is further configured to identify, from a simultaneous substantial absence of IR radiation on the first IR element and substantial presence of visible light on the first ambient light-sensing element, a negative state indicating no motion.

9. The device of claim 6, wherein the processor is further configured to identify, from a simultaneous substantial presence of IR radiation on the first IR element and substantial absence of visible light on the first ambient light-sensing element, a positive state indicating motion.

10. The device of claim 9, wherein the processor is further configured to initiate, in response to having identified the positive state, turning on one or more of a camera, a light, an alarm, or a combination thereof.

11. The device of claim 6, wherein the processor is further configured to identify, from a simultaneous substantial absence of IR radiation on the first IR element and substantial absence of visible light on the first ambient light-sensing element, a negative state indicating no motion.

12. The device of claim 6, wherein the processor is further configured to identify, from a presence of visible light on the first ambient light-sensing element, a state of ambient lighting in an atmosphere adjacent to the mixed-element array.

13. The device of claim 6, wherein the processor is further configured to adjust, based on information in the second output, processing of the first output.

14. The device of claim 6, wherein the processor is further configured to identify, from the first output and the second output, one or more of:
- a transition from a substantial absence of the IR radiation on the first IR element to a substantial presence of the IR radiation on the first IR element;
- a transition from the substantial presence of the IR radiation on the first IR element to the substantial absence of the IR radiation on the first IR element;
- a transition from a substantial absence of the visible light on the first ambient light-sensing element to a substantial presence of the visible light on the first ambient light-sensing element;
- a transition from the substantial presence of the visible light on the first ambient light-sensing element to the substantial absence of the visible light on the first ambient light-sensing element; or
- a combination thereof.

15. The device of claim 1, further comprising:
- a second lens including a second plurality of lenslets configured to direct the second received IR radiation and configured to direct the second received visible light.

16. The device of claim 15, wherein:
- the first output is coupled with an inverted version of the third output;
- the second output is coupled with an inverted version of the fourth output;
- the third output is coupled with an inverted version of the first output;
- the fourth output is coupled with an inverted version of the second output; or
- a combination thereof.

17. The device of claim 1, further comprising a security system coupled to the mixed-element array.

18. A non-transitory computer-readable medium, comprising:
- instructions stored on the non-transitory computer-readable medium, wherein the instructions are configured to determine, for a security system, a false positive state that indicates no motion, the instructions configured to cause a processor to:
  - receive, from two infrared (IR) elements coupled in parallel with reverse polarity, first input data indicating an IR radiation intensity;
  - receive, from two ambient light-sensing elements coupled in parallel with reverse polarity, second input data indicating a visible light intensity;
  - identify, from the first input data and the second input data, one or more of a substantial presence of IR radiation or a substantial absence of IR radiation;
  - identify, from the first input data and the second input data, one or more of a substantial presence of visible light or a substantial absence of visible light;
  - determine, in response to the substantial presence of IR radiation simultaneously with the substantial presence of visible light, the false positive state that indicates no motion; and
  - produce, in response to a determination of the false positive state that indicates no motion, a signal to be sent to the security system, the signal configured to rule out, for the security system, the false positive state that indicates no motion.

19. The non-transitory computer-readable medium of claim 18, wherein the instructions are further configured to cause the processor to identify, from the substantial absence of IR radiation simultaneously with the substantial presence of visible light, a negative state indicating no motion.

20. The non-transitory computer-readable medium of claim 18, wherein the instructions are further configured to cause the processor to identify, from the substantial presence of IR radiation simultaneously with the substantial absence of visible light, a positive state indicating motion.

21. The non-transitory computer-readable medium of claim 20, wherein the instructions are further configured to cause the processor to initiate, in response to having identified the positive state, turning on one or more of a camera, a light, an alarm, or a combination thereof.

22. The non-transitory computer-readable medium of claim 18, wherein the instructions are further configured to cause the processor to identify, from the substantial absence of IR radiation simultaneously with the substantial absence of visible light, a negative state indicating no motion.

23. The non-transitory computer-readable medium of claim 18, wherein the instructions are further configured to cause the processor to identify, from the substantial presence of visible light, a state of ambient lighting in an atmosphere adjacent to a mixed-element array.

24. The non-transitory computer-readable medium of claim 18, wherein the instructions are further configured to cause the processor to adjust, based on information in the second input data, processing of the first input data.

25. The non-transitory computer-readable medium of claim 18, wherein the instructions are further configured to cause the processor to identify, from the first input data and the second input data, one or more of:
- a transition from the substantial absence of IR radiation to the substantial presence of IR radiation;
- a transition from the substantial presence of IR radiation to the substantial absence of IR radiation;
- a transition from the substantial absence of visible light to the substantial presence of visible light;
- a transition from the substantial presence of visible light to the substantial absence of visible light; or
- a combination thereof.

26. An apparatus for determining, for a security system, a false positive state that indicates no motion, the apparatus comprising:
- a memory; and
- a processor coupled to the memory and configured to:
  - receive, from two infrared (IR) elements coupled in parallel with reverse polarity, first input data indicating an infrared (IR) radiation intensity;
  - receive, from two ambient light-sensing elements coupled in parallel with reverse polarity, second input data indicating a visible light intensity;

identify, from the first input data and the second input data, one or more of a substantial presence of IR radiation or a substantial absence of IR radiation;

identify, from the first input data and the second input data, one or more of a substantial presence of visible light or a substantial absence of visible light;

determine, in response to the substantial presence of IR radiation simultaneously with the substantial presence of visible light, the false positive state that indicates no motion; and produce, in response to a determination of the false positive state that indicates no motion, a signal to be sent to the security system, the signal configured to rule out, for the security system, the false positive state that indicates no motion.

27. The apparatus of claim 26, wherein the processor is further configured to identify, from the substantial absence of IR radiation simultaneously with the substantial presence of visible light, a negative state indicating no motion.

28. The apparatus of claim 26, wherein the processor is further configured to identify, from the substantial presence of IR radiation simultaneously with the substantial absence of visible light, a positive state indicating motion.

29. The apparatus of claim 28, wherein the processor is further configured to initiate, in response to having identified the positive state, turning on one or more of a camera, a light, an alarm, or a combination thereof.

30. The apparatus of claim 26, wherein the processor is further configured to identify, from the substantial absence of IR radiation simultaneously with the substantial absence of visible light, a negative state indicating no motion.

31. The apparatus of claim 26, wherein the processor is further configured to identify, from the substantial presence of visible light, a state of ambient lighting in an atmosphere adjacent to a mixed-element array.

32. The apparatus of claim 26, wherein the processor is further configured to identify, from the first input data and the second input data, one or more of:

a transition from the substantial absence of IR radiation to the substantial presence of IR radiation;

a transition from the substantial presence of IR radiation to the substantial absence of IR radiation;

a transition from the substantial absence of visible light to the substantial presence of visible light;

a transition from the substantial presence of visible light to the substantial absence of visible light; or a combination thereof.

33. A method, comprising:

receiving, from two infrared (IR) elements coupled in parallel with reverse polarity, first input data indicating an IR radiation intensity;

receiving, from two ambient light-sensing elements coupled in parallel with reverse polarity, second input data indicating a visible light intensity;

identifying, from the first input data and the second input data, one or more of a presence of IR radiation or an absence of IR radiation; and identifying, from the first input data and the second input data, one or more of a presence of visible light or an absence of visible light.

* * * * *